(12) United States Patent
Jung et al.

(10) Patent No.: US 10,904,884 B2
(45) Date of Patent: Jan. 26, 2021

(54) ELECTRONIC DEVICE PERFORMING WI-FI COMMUNICATION AND OPERATION METHOD THEREOF

(71) Applicant: Samsung Electronics Co., Ltd., Gyeonggi-do (KR)

(72) Inventors: Bu-Seop Jung, Gyeonggi-do (KR); Young-Kow Lee, Gyeonggi-do (KR); Hyung-Wook Kang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 52 days.

(21) Appl. No.: 16/058,325

(22) Filed: Aug. 8, 2018

(65) Prior Publication Data
US 2019/0053236 A1    Feb. 14, 2019

(30) Foreign Application Priority Data

Aug. 8, 2017 (KR) .................. 10-2017-0100595

(51) Int. Cl.
| | |
|---|---|
| *H04W 72/04* | (2009.01) |
| *H04W 72/10* | (2009.01) |
| *H04B 7/04* | (2017.01) |
| *H04W 84/12* | (2009.01) |
| *H04B 5/00* | (2006.01) |

(52) U.S. Cl.
CPC .......... *H04W 72/0453* (2013.01); *H04B 7/04* (2013.01); *H04W 72/10* (2013.01); *H04B 5/0025* (2013.01); *H04W 84/12* (2013.01)

(58) Field of Classification Search
CPC ..... H04W 72/10; H04W 72/0453; H04B 7/04
See application file for complete search history.

(56) References Cited

U.S. PATENT DOCUMENTS

| | | | | |
|---|---|---|---|---|
| 8,861,446 | B2 * | 10/2014 | Jain ..................... | H04B 7/0695 370/329 |
| 9,172,441 | B2 * | 10/2015 | Granger-Jones ..... | H04B 7/0404 |
| 9,839,006 | B1 * | 12/2017 | Zakaria ................. | H04B 1/406 |
| 2003/0050032 | A1 * | 3/2003 | Masaki ................. | H01Q 1/243 455/272 |
| 2005/0186986 | A1 * | 8/2005 | Hansen ................. | H04L 1/0057 455/553.1 |
| 2009/0141691 | A1 * | 6/2009 | Jain ...................... | H04W 88/10 370/338 |
| 2012/0133570 | A1 * | 5/2012 | Maruyama ............ | H01Q 21/28 343/853 |
| 2013/0157603 | A1 * | 6/2013 | Behzad ................ | H04B 1/0057 455/272 |
| 2013/0182846 | A1 * | 7/2013 | Yamada ................ | H04W 12/02 380/270 |
| 2015/0036656 | A1 * | 2/2015 | McCarthy ............ | H04B 7/0689 370/331 |

(Continued)

*Primary Examiner* — Redentor Pasia
(74) *Attorney, Agent, or Firm* — The Farrell Law Firm, P.C.

(57) ABSTRACT

An electronic device is provided. The electronic device includes a processor and a wireless communication circuit. The wireless communication circuit transmits a Wi-Fi signal corresponding to a first frequency band using a first module for a first period, transmits a Wi-Fi signal corresponding to a second frequency band using a second module for a second period, and receives a Wi-Fi signal using the first module and the second module for the first period and the second period.

18 Claims, 12 Drawing Sheets

(56) References Cited

U.S. PATENT DOCUMENTS

| | | | |
|---|---|---|---|
| 2015/0103663 A1* | 4/2015 | Amini | H04W 28/0215 |
| | | | 370/235 |
| 2015/0126182 A1* | 5/2015 | Dong | H04W 88/06 |
| | | | 455/426.1 |
| 2016/0088631 A1 | 3/2016 | Hedayat et al. | |
| 2016/0242222 A1* | 8/2016 | Adams | H04W 52/0261 |
| 2016/0295563 A1* | 10/2016 | Bai | H04W 72/0486 |
| 2016/0302242 A1 | 10/2016 | Masputra | |
| 2017/0033461 A1 | 2/2017 | Mohajer Jasebi et al. | |
| 2017/0034703 A1 | 2/2017 | Dimatteo et al. | |
| 2018/0084538 A1* | 3/2018 | Jupudi | H04W 72/048 |
| 2019/0335282 A1* | 10/2019 | Peters | H04N 21/44231 |

* cited by examiner

ELECTRONIC DEVICE PERFORMING WI-FI COMMUNICATION AND OPERATION METHOD THEREOF

CROSS-REFERENCE TO RELATED APPLICATION(S)

This application is based on and claims priority under 35 U.S.C. § 119 to Korean Patent Application Serial No. 10-2017-0100595, filed on Aug. 8, 2017 in the Korean Intellectual Property Office, the entire disclosure of which is incorporated herein by reference.

BACKGROUND

1. Field

The disclosure relates, generally, to an electronic device, and more particularly, to an electronic device for transmitting and receiving Wi-Fi signals corresponding to a plurality of frequency bands, and a method of controlling the same.

2. Description of the Related Art

Electronic devices can support Wi-Fi over a plurality of frequencies. For example, a dual-band router can support Wi-Fi over 5 GHz and Wi-Fi over 2.4 GHz.

However, an electronic device that supports Wi-Fi connections using a plurality of different frequencies as one baseband is physically unable to support multiple Wi-Fi connections at the same time and thus may use a time division-based communication mode using the used frequencies.

SUMMARY

The present disclosure has been made to address at least the disadvantages described above and to provide at least the advantages described below.

Accordingly, an aspect of the present disclosure provides an electronic device. The electronic device includes a housing, a touch screen display configured to be exposed through a portion of the housing, and a wireless communication circuit. The wireless communication circuit includes a first module comprising a first circuit configured to perform at least one of transmission and reception of a Wi-Fi signal in a first frequency range and a second circuit configured to perform at least one of transmission and reception of a Wi-Fi signal in a second frequency range, and a second module comprising a third circuit configured to perform at least one of transmission and reception of a Wi-Fi signal in the first frequency range and a fourth circuit configured to perform at least one of transmission and reception of a Wi-Fi signal in the second frequency range, a first antenna configured to be electrically connectable to at least one of the first circuit, the second circuit, the third circuit, and the fourth circuit, a second antenna configured to be electrically connectable to at least one of the first circuit, the second circuit, the third circuit, and the fourth circuit, and a processor configured to be electrically connected to the touch screen display and the wireless communication circuit. The wireless communication circuit is configured to transmit a first Wi-Fi signal for a first period (t1) using the first circuit, the first antenna, and the second antenna, without using the second circuit, the third circuit, and the fourth circuit, transmit a second Wi-Fi signal for a second period (t2), which follows the first period, using the fourth circuit, the first antenna, and the second antenna, without using the first circuit, the second circuit, and the third circuit, transmit a third Wi-Fi signal for a third period (t3), which follows the second period, using the first circuit, the first antenna, and the second antenna, without using the second circuit, the third circuit, and the fourth circuit, transmit a fourth Wi-Fi signal for a fourth period (t4), which follows the third period, using the fourth circuit, the first antenna, and the second antenna, without using the first circuit, the second circuit, and the third circuit, and receive a Wi-Fi signal for the first period to the fourth period using the first circuit, the fourth circuit, the first antenna, and the second antenna.

An aspect of the disclosure provides a method for controlling an electronic device. The method includes transmitting a first Wi-Fi signal corresponding to a first frequency band using a first module for a first period, and transmitting a second Wi-Fi signal corresponding to a second frequency band using a second module for a second period. The electronic device receives a Wi-Fi signal using the first module and the second module for the first period and the second period.

An aspect of the disclosure provides an electronic device. The electronic device includes a processor and a wireless communication circuit. The wireless communication circuit transmits a Wi-Fi signal corresponding to a first frequency band using a first module for a first period, transmits a Wi-Fi signal corresponding to a second frequency band using a second module for a second period, and receives a Wi-Fi signal using the first module and the second module for the first period and the second period.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
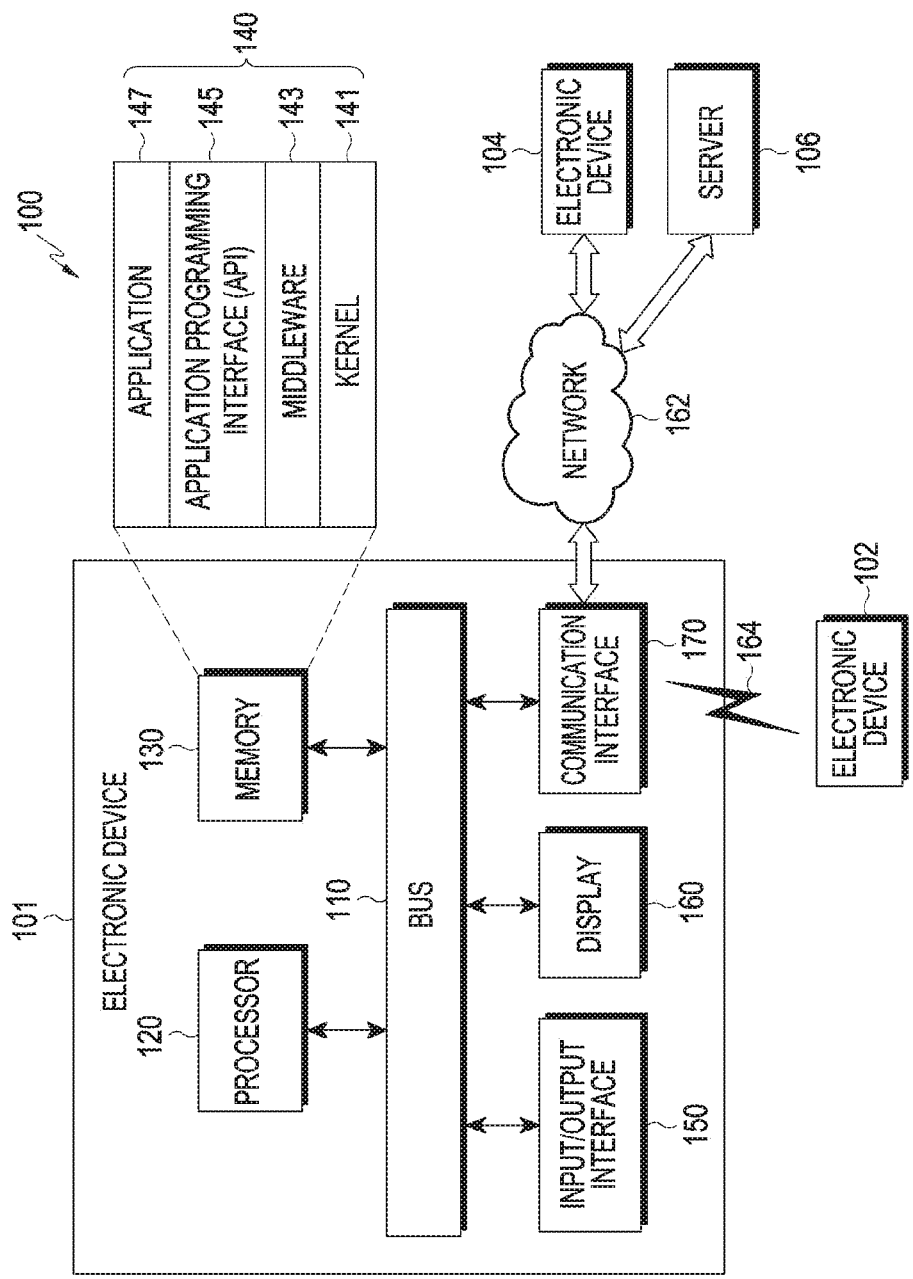
FIG. 1 is a diagram of a network environment including an electronic device according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram an electronic device 101 in a network environment 100 according to an embodiment.

Referring to FIG. 1, the electronic device 101 may include a bus 110, a processor 120, a memory 130, an input/output interface 150, a display 160, and a communication interface 170. At least one of the components may be omitted, or other components may be further included in the electronic device 101. The bus 110 may include a circuit that connects the components 110 to 170 to each other and delivers communications (e.g., control messages or data) between the components. The processor 120 may include one or more of a CPU, an AP, and a communication processor (CP). The processor 120 may control at least one different component of the electronic device 101, and/or may perform operations relating to communication or data processing.

The memory 130 may include volatile and/or nonvolatile memory. The memory 130 may store a command or data related to at least one different component of the electronic device 101. The memory 130 may store software and/or a program 140. The program 140 may include a kernel 141, middleware 143, an application programming interface (API) 145, and/or an application (or "app") 147. At least part of the kernel 141, the middleware 143, and the API 145 may be designated as an operating system (OS). The kernel 141 may control or manage system resources (e.g., the bus 110, the processor 120, the memory 130, or the like) used to perform an operation or function implemented, for example, in other programs (e.g., the middleware 143, the API 145, or the application 147). The kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data. The middleware 143 may process one or more requests for operations received from the application 147 according to the priority thereof. The middleware 143 may assign at least one application 147 a priority for using a system resource of the electronic device 101 (e.g., the bus 110, the processor 120, the memory 130, or the like) and may process the one or more requests for operations. The API 145 is an interface for the application 147 to control a function provided from the kernel 141 or the middleware 143, and may include at least one interface or function (e.g., a command) for file control, window control, image processing, or text control. The input/output interface 150 may deliver a command or data, which is input from a user or a different external device, to a different component(s) of the electronic device 101, or may output a command or data, which is received from a different component(s) of the electronic device 101, to the user or to the different external device.

The display 160 may include a liquid crystal display (LCD), a light-emitting diode (LED) display, an organic light-emitting diode (OLED) display, a micro-electro-mechanical systems (MEMS) display, or an electronic paper display. The display 160 may display various types of content (for example, text, an image, a video, an icon, and/or a symbol) for the user. The display 160 may include a touch screen and may receive touch, gesture, proximity, or hovering input using an electronic input tool or a body part of a user. The communication interface 170 may establish communication between the electronic device 101 and an external device (e.g., a first external electronic device 102, a second external electronic device 104, or a server 106). The communication interface 170 may be connected to a network 162 via wireless communication or wired communication to communicate with the external device (e.g., the second external electronic device 104 or the server 106).

The wireless communication may include cellular communication using at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). The wireless communication may include an element 164, which may be at least one of wireless fidelity (Wi-Fi), light fidelity (Li-Fi), Bluetooth, Bluetooth low energy (BLE), ZigBee, near-field communication (NFC), magnetic secure transmission (MST), radio frequency (RF), and a body area network (BAN). The wireless communication may include a global navigation satellite system (GNSS). The GNSS may be a global positioning system (GPS), a global navigation satellite system (GNSS), a BeiDou navigation satellite system (hereinafter, "BeiDou"), or Galileo, which is the European global satellite-based navigation system. "GPS" may be interchangeably used with "GNSS" herein. The wired communication may include at least one of universal serial bus (USB), high-definition multimedia interface (HDMI), recommended standard 232 (RS-232), power line communication, and plain old telephone service (POTS). The network 162 may include a telecommunications network, which may be at least one of a computer network (for example, a local area network (LAN) or wide area network (WAN)), the Internet, and a telephone network.

Each of the first and second external electronic devices 102 and 104 may be a device of a type that is the same as, or different from, that of the electronic device 101. All or some of the operations performed in the electronic device 101 may be performed in another electronic device or a plurality of electronic devices (e.g., the electronic devices 102 and 104 or the server 106). When the electronic device 101 needs to perform a function or service automatically or upon request, the electronic device 101 may request another electronic device (e.g., the electronic device 102 or 104, or the server 106) to perform at least some functions related to the function or service, instead of, or in addition to, autonomously performing the function or service. The other electronic device (e.g., the electronic device 102 or 104, or the server 106) may perform the requested functions or additional functions and may transmit the result thereof to the electronic device 101. The electronic device 101 may provide the requested function or service using the result as it was received or after additionally processing the result. To this end, cloud-computing, distributed-computing, or client-server-computing technologies may be used.

Figure 2:
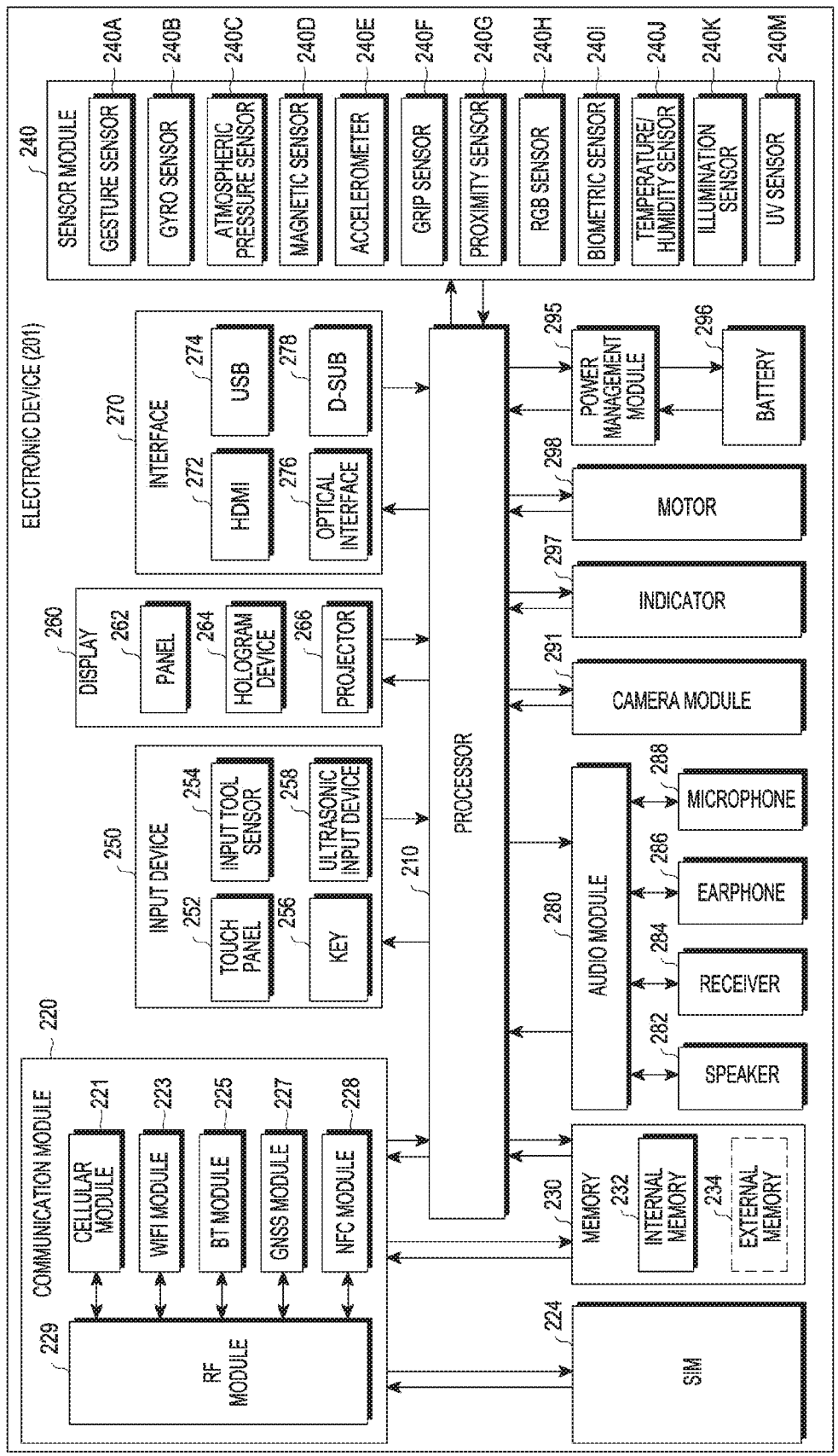
FIG. 2 is a diagram of an electronic device according to an embodiment.

FIG. 2 is a diagram of an electronic device according to an embodiment.

Referring to FIG. 2, the electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processors 210 may run an operating system or an application to control a plurality of hardware or software components that are connected to the processors 210, and may perform various kinds of data processing and operations. The processors 210 may be configured as a system on chip (SoC). The processors 210 may further include a graphic processing unit (GPU) and/or an image signal processor. The processors 210 may include at least some (e.g., a cellular module 221) of the components depicted in FIG. 2. The processors 210 may load a command or data received from at least one of other components (e.g., a nonvolatile memory) into a volatile memory to process the command or data, and may store resultant data in the nonvolatile memory.

The communication module 220 may include a cellular module 221, a Wi-Fi module 223, a Bluetooth module 225, a GNSS module 227, an NFC module 228, and an RF module 229. The cellular module 221 may provide a voice call, a video call, a text messaging service, or an Internet service through a communication network. The cellular module 221 may perform identification and authentication of the electronic device 201 in a communication network using a SIM (e.g., a SIM card) 224. The cellular module 221 may perform at least some of the functions provided by the processors 210. The cellular module 221 may include a CP. At least some of the cellular module 221, the Wi-Fi module 223, the Bluetooth module 225, the GNSS module 227, and the NFC module 228 may be included in one integrated chip (IC) or IC package. The RF module 229 may transmit and receive a communication signal (e.g., an RF signal). The RF module 229 may include a transceiver, a power amplifier (amp) module (PAM), a frequency filter, a low-noise amplifier (LNA), an antenna, or the like. At least one of the cellular module 221, the Wi-Fi module 223, the Bluetooth module 225, the GNSS module 227, and the NFC module 228 may transmit and receive an RF signal through a separate RF module. The SIM 224 may include a card including a SIM or an embedded SIM, and may include unique identification information (e.g., an integrated circuit card identifier (ICCID)) or subscriber information (e.g., an international mobile subscriber identity (IMSI)).

The memory 230 may include an internal memory 232 or an external memory 234. The internal memory 232 may include at least one of a volatile memory (for example, a dynamic random-access memory (DRAM), a static RAM (SRAM), a synchronous dynamic RAM (SDRAM), or the like) and a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid-state drive (SSD)). The external memory 234 may include a flash drive, a compact flash (CF), a secure digital (SD), a micro secure digital (micro-SD), a mini secure digital (mini-SD), an extreme digital (xD), a multi-media card (MMC), a memory stick, or the like. The external memory 234 may be functionally or physically connected to the electronic device 201 through various interfaces.

The sensor module 240 may measure physical quantities, or may detect the state of operation of the electronic device 201 and convert measured or detected information into an electrical signal. The sensor module 240 may include at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. The electronic device 201 may further include a processor configured, as a part of the processors 210 or separately from the processors 210, to control the sensor module 240, thereby controlling the sensor module 240 while the processors 210 are in a sleep state.

The input device 250 may include a touch panel 252, an input tool sensor 254 (e.g., which may be a digital input tool sensor), a key 256, or an ultrasonic input device 258. The touch panel 252 may be at least one of an electrostatic type, a pressure-sensitive type, an infrared type, and an ultrasonic type. Further, the touch panel 252 may further include a control circuit. The touch panel 252 may further include a tactile layer to provide a user with a tactile response. The input tool sensor 254 may be part of the touch panel or may include a separate recognition sheet. The key 256 may include a physical button, an optical key, or a keypad. The ultrasonic input device 258 may detect ultrasonic waves generated in an input tool through a microphone 288) and may identify data corresponding to the detected ultrasonic waves.

The display 260 may include a panel 262, a hologram device 264, a projector 266, and/or a control circuit to control these components. The panel 262 may be configured to be flexible, transparent, or wearable. The panel 262 may be formed with the touch panel 252 in one or more modules. The panel 262 may include a pressure sensor (or force sensor) to measure the strength of pressure of a user's touch. The pressure sensor may be formed with the touch panel 252 in a single body, or may be provided as one or more sensors separate from the touch panel 252. The hologram device 264 may display a three-dimensional image in the air using light interference. The projector 266 may project light onto a screen to display an image. The screen may be disposed inside or outside the electronic device 201. The interface 270 may include an HDMI 272, a USB 274, an optical interface 276, or a D-subminiature (D-sub) interface 278. The interface 270 may be included in the communication interface 170 depicted in FIG. 1. Additionally or alternatively, the interface 270 may include a mobile high-definition link (MHL) interface, an SD card/MMC interface, or an infrared data association (IrDA) interface.

The audio module 280 may bidirectionally convert sound and an electrical signal. At least some components of the audio module 280 may be included in the input/output interface 150 depicted in FIG. 1. The audio module 280 may process sound information input or output through a speaker 282, a receiver 284, earphones 286, or the microphone 288. The camera module 291 is a device that takes a still image and a video. The camera module 291 may include one or more image sensors (e.g., a front sensor or a rear sensor), a lens, an image signal processor (ISP), or a flash (e.g., an LED, a xenon lamp, or the like). The power management module 295 may manage the power of the electronic device 201. The power management module 295 may include a power management integrated circuit (PMIC), a charger IC, or a battery or fuel gauge. The PMIC may have wired and/or wireless charging methods. The wireless charging methods may include a magnetic-resonance method, a magnetic-induction method, or an electromagnetic-wave method, and may further include an additional circuit for wireless charging, such as a coil loop, a resonance circuit, or a rectifier. The battery gauge may measure the remaining battery charge, the charging voltage, the current, or temperature of the battery 296. The battery 296 may include a rechargeable battery and/or a solar battery.

The indicator 297 may display the specific state of the electronic device 201 or a component thereof (e.g., the processors 210), which may be a booting state, a message state, or a charging state. The motor 298 may convert an electrical signal into mechanical vibrations, and may generate vibrations or a haptic effect. The electronic device 201 may include a mobile-TV-supporting device (for example, a GPU) that is capable of processing media data in accordance with digital multimedia broadcasting (DMB), digital video broadcasting (DVB), or mediaFlo™ standards. Each element mentioned in the present document may include one or more components, and may be designated by different terms depending on the type of the electronic device. An electronic device may be configured such that some elements are omitted, additional elements are further included, or some of the elements are combined into one entity, which may perform the same functions as those of the corresponding elements before combination.

Figure 3:
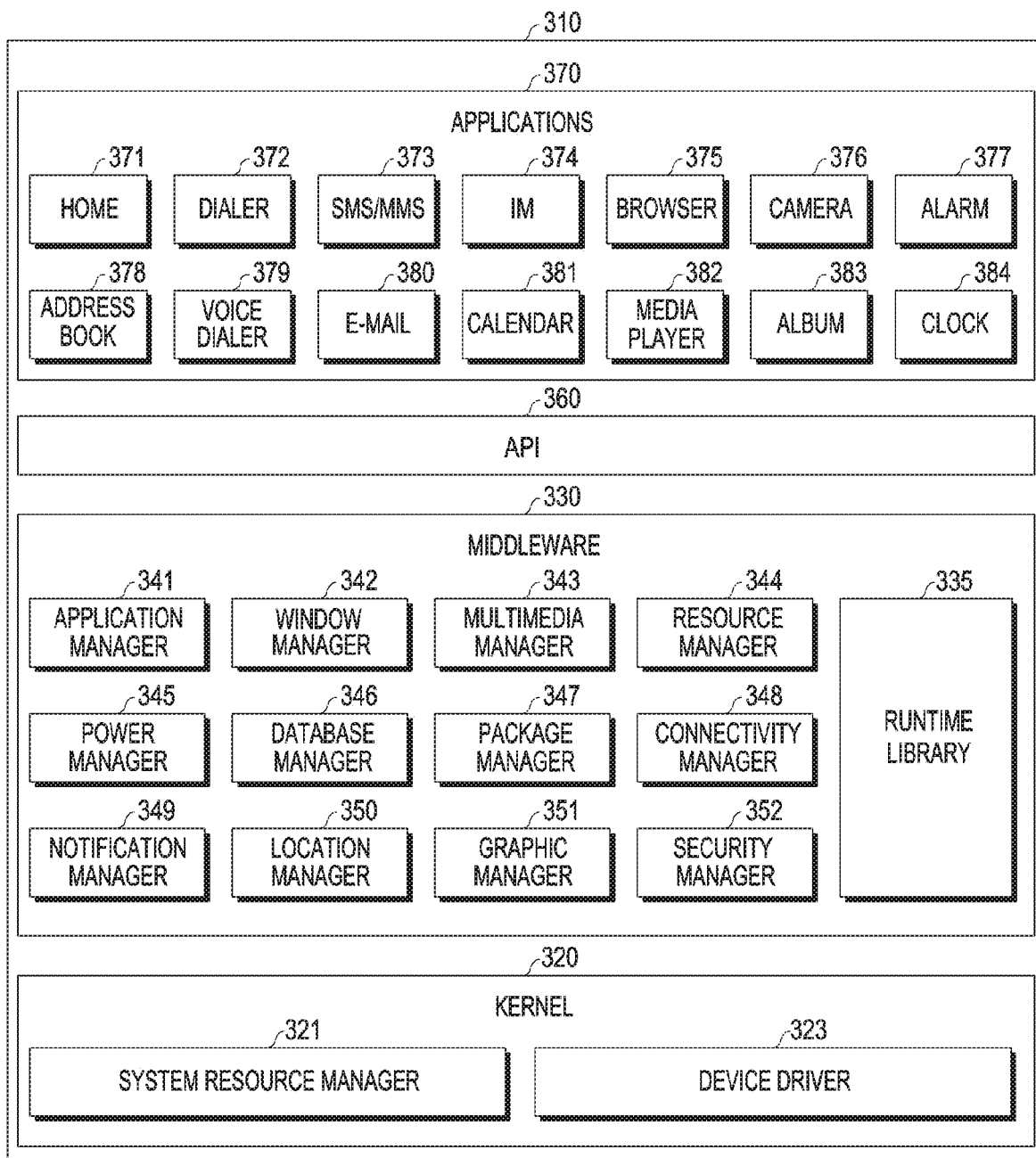
FIG. 3 is a diagram of a program module according to an embodiment.

FIG. 3 is a diagram of a program module according to an embodiment.

Referring to FIG. 3, the program module 310 may include an operating system that controls resources related to an electronic device and/or various applications that run on the operating system. The operating system may include Android™, iOS™ Windows™, Symbian™, Tizen™, Bada™, or the like. The program module 310 may include a kernel 320, middleware 330, an API 360, and/or an application 370. At least part of the program module 310 may be preloaded onto the electronic device or may be downloaded from an external electronic device.

The kernel 320 may include a system resource manager 321 and/or a device driver 323. The system resource manager 321 may perform control, allocation, or recovery of system resources. The system resource manager 321 may include a process manager, a memory manager, or a file-system manager. The device driver 323 may include a display driver, a camera driver, a Bluetooth driver, a shared memory driver, a USB driver, a keypad driver, a Wi-Fi driver, an audio driver, or an inter-process communication (IPC) driver. The middleware 330 may provide functions commonly needed for applications 370, or may provide an application 370 with various functions through the API 360 so that the application 370 may use the limited system resources in the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a complier to add a new function through a programming language while the application 370 is running. The runtime library 335 may perform input/output management, memory management, or arithmetic function processing. The application manager 341 may manage the life cycle of the application 370. The window manager 342 may manage graphic user interface (GUI) resources used for a screen. The multimedia manager 343 may identify formats that are necessary to play media files, and may encrypt or decrypt a media file using a codec suitable for a corresponding format. The resource manager 344 may manage source code or memory space for the application 370. The power manager 345 may manage the capacity, temperature or power supply of a battery, and may determine or provide information on power necessary for the operation of the electronic device using corresponding information among the foregoing pieces of information. The power manager 345 may interwork with a basic input/output system (BIOS). The database manager 346 may generate, retrieve, or change a database to be used for the application 370. The package manager 347 may manage the installation or updating of an application distributed in the form of a package file.

The connectivity manager 348 may manage wireless connectivity. The notification manager 349 may provide a user with an event an incoming message, an appointment, and a proximity notification. The location manager 350 may manage information about the location of the electronic device. The graphic manager 351 may manage a graphic effect to be provided for the user or a user interface related to the graphic effect. The security manager 352 may provide system security or user authentication. The middleware 330 may include a telephony manager to manage a voice or video call function of the electronic device or a middleware module that is capable of forming combinations of functions of the foregoing elements. The middleware 330 may provide a specialized module for each operating system. The middleware 330 may dynamically delete some of the existing elements or add new elements. The API 360 is a set of API programming functions, and may be provided with a different configuration depending on the operating system. One API set for each platform may be provided in Android or iOS, while two or more API sets for each platform may be provided in Tizen.

The application 370 may include a home screen 371, a dialer 372, an SMS/MMS 373, instant messaging (IM) 374, a browser 375, a camera 376, an alarm 377, an address book 378, a voice dialer 379, email 380, a calendar 381, a media player 382, an album 383, a clock 384, a healthcare application (e.g., for measuring exercising or blood sugar), or an environmental data application (e.g., for providing atmospheric pressure, humidity, or temperature data). The application 370 may include an information exchange application that is capable of supporting information exchange between the electronic device and an external electronic device. The information exchange application may include a notification relay application for relaying specific information to the external electronic device or a device management application for managing the external electronic device. The notification relay application may relay notification information, which is generated in another application of the electronic device, to the external electronic device, or may receive notification information from the external electronic device and provide the notification information to the user. The device management application may install, delete, or update a function (e.g., a function of turning on/turning off the external electronic device itself (or some components thereof) or adjusting the brightness (or resolution) of a display) of an external electronic device communicating with the electronic device or an application operating in the external electronic device. The application 370 may include an application (e.g., a healthcare application of a mobile medical device) assigned according to the attributes of the external electronic device. The application 370 may include an application received from the external electronic device. At least part of the program module 310 may be implemented by software, firmware, hardware, or combinations of at least two or more thereof, and may include a module, a program, a routine, sets of instructions, or a process to perform one or more functions.

Figure 4A:
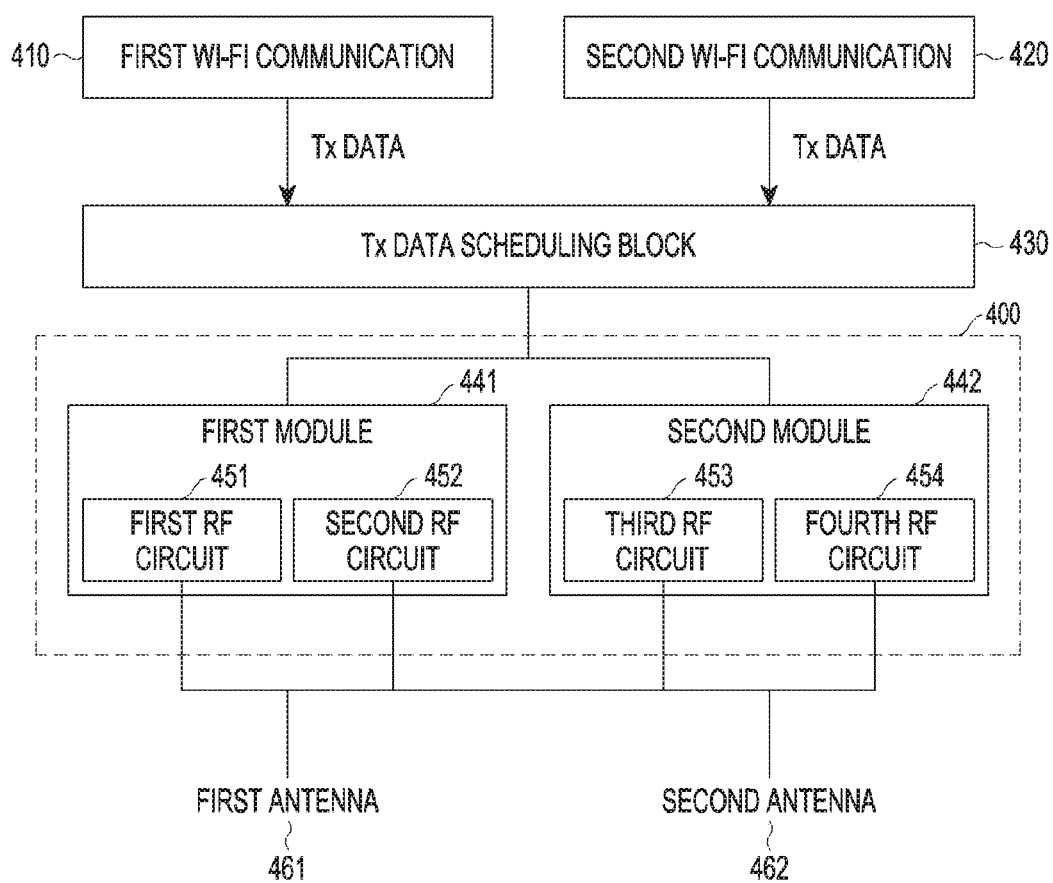
FIG. 4A is a diagram of a configuration of an electronic device according to an embodiment.

FIG. 4A is a diagram of a configuration of an electronic device according to an embodiment.

Referring to FIG. 4A, an electronic device may include a housing, a touch screen display exposed through a portion of the housing, a wireless communication circuit 400, a first antenna 461, a second antenna 462, and a Tx data scheduling block. The wireless communication circuit 400 may include a first module 441 and a second module 442. The first module 441 may include a first RF circuit 451 to perform at least one of transmission and reception of a Wi-Fi signal in a first frequency band, and a second RF circuit 452 to perform at least one of transmission and reception of a Wi-Fi signal in a second frequency band. The second module 442 may include a third RF circuit 453 to perform at least one of transmission and reception of a Wi-Fi signal in the first frequency band, and a fourth RF circuit 454 to perform at least one of transmission and reception of a Wi-Fi signal in the second frequency band. The first antenna 461 may be electrically connected to at least one of the first RF circuit to the fourth RF circuit, and the second antenna 462 may be electrically connected to at least one of the first RF circuit to the fourth RF circuit. The Tx data scheduling block 430 may be electrically connected to the touch screen display and the wireless communication circuit 400. The first frequency band may be a frequency band including 2.4 GHz, and the second frequency band may be a frequency band including 5.0 GHz.

When the electronic device 101 transmits Tx data using a circuit 410 for generating Tx data of first Wi-Fi communication and a circuit 420 for generating Tx data of second Wi-Fi communication, the Tx data scheduling block 430 may transmit the data to transmit via a Wi-Fi signal alternately using the first module 441 and the second module 442. The Tx data scheduling block 430 may transmit the Tx data by being connected to a service using the first Wi-Fi communication or a service using the second Wi-Fi communication or may transmit the Tx data on the basis of Tx data of an application using each of the Wi-Fi communications. Each of the first module 441 and the second module 442 may process the received Tx data into a form for communication, and each of the RF circuits 451 to 454 may generate an electrical signal to be applied to an antenna using the processed data. The Tx data scheduling block 430 may be configured as a hardware chip included in the communication interface 170 or the communication module 220 or may be a logical block in the communication interface 170 or the communication module 220. The first module 441 may include the first RF circuit 451 and the second RF circuit 452, and the second module 442 may include the third RF circuit 453 an the fourth RF circuit 454. The electronic device may receive data for first to fourth periods using the first RF circuit 451 of the first module, the second RF circuit 452 of the first module, the third RF circuit 453 of the second module, and the fourth RF circuit 454 of the second module. When the wireless communication circuit 400 of the electronic device receives a Wi-Fi signal, the electronic device may maintain a 2*2 MIMO mode simultaneously using the first module 441 and the second module 442. When the wireless communication circuit 400 transmits a Wi-Fi signal, the electronic device may prevent the first module 441 and the second module 442 from operating at the same time. A module responsible for one connection may be allowed to perform data transmission for an arbitrarily scheduled time.

Figure 4B:
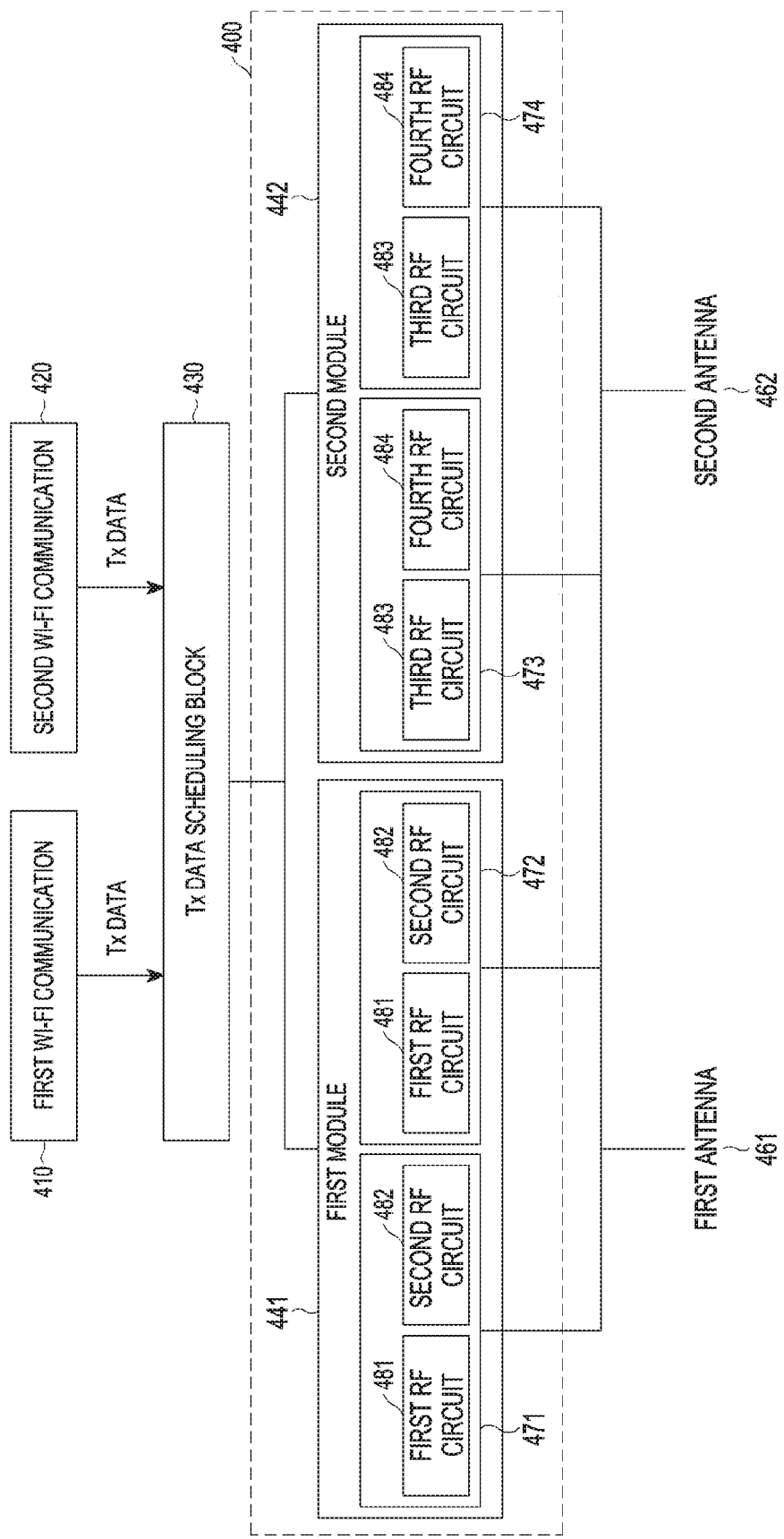
FIG. 4B is a diagram of an electronic device according to an embodiment.

FIG. 4B is a diagram of an electronic device according to an embodiment.

Referring to FIG. 4B, an electronic device may include a touch screen display, a wireless communication circuit 400, a first antenna 461, a second antenna 462, and a Tx data scheduling block. The wireless communication circuit 400 may include a first module 441 and a second module 442. The first module 441 may include at least one first RF circuit 481 to perform at least one of transmission and reception of a Wi-Fi signal in a first frequency band, and at least one second RF circuit 482 to perform at least one of transmission and reception of a Wi-Fi signal in a second frequency band. The second module 442 may include at least one third RF circuit 483 to perform at least one of transmission and reception of a Wi-Fi signal in the first frequency band, and at least one fourth RF circuit 484 to perform at least one of transmission and reception of a Wi-Fi signal in the second frequency band. Each of the at least one first RF circuit 481 and each of the at least one second RF circuit 482 included in the first module 441 may be disposed in a first core 471 and a second core 472 included in the first module 441. Each of the at least one third RF circuit 483 and each of the at least one fourth RF circuit 484 included in the second module 442 may be disposed in a third core 473 and a fourth core 474 included in the second module 442.

The first antenna 461 may be electrically connected to at least one of the at least one first RF circuit 481 to the at least one fourth RF circuit 484, and the second antenna 462 may be electrically connected to at least one of the at least one first RF circuit 481 to the at least one fourth RF circuit 484. The Tx data scheduling block 430 may be electrically connected to the touch screen display and the wireless communication circuit 400. The first frequency band may be a frequency band including 2.4 GHz, and the second frequency band may be a frequency band including 5.0 GHz.

When the electronic device 101 is connected to a circuit 410 for generating Tx data of first Wi-Fi communication and a circuit 420 for generating Tx data of second Wi-Fi communication and transmits Tx data, the Tx data scheduling block 430 may transmit the data to transmit via a Wi-Fi signal alternately using the first module 441 and the second module 442. The Tx data scheduling block 430 may transmit the Tx data by being connected to a service using the first Wi-Fi communication or a service using the second Wi-Fi communication or may transmit the Tx data on the basis of Tx data of an application using each of the Wi-Fi communications.

Each of the first module 441 and the second module 442 may process the received Tx data into a form for communication, and each of the at least one first RF circuit 481 to the at least fourth RF circuit 484 may generate an electrical signal to be applied to an antenna using the processed data. The Tx data scheduling block 430 may be configured as a hardware chip included in the communication interface 170 or the communication module 220 or may be a logical block in the communication interface 170 or the communication module 220. The electronic device may receive data for first to fourth periods using the at least one first RF circuit 481 included in the first module 441, the at least one second RF circuit 482 included in the first module 441, the at least one third RF circuit 483 included in the second module 442, and the at least one fourth RF circuit 484 included in the second module 442. When the wireless communication circuit of the electronic device receives a Wi-Fi signal, the electronic device may maintain a 2*2 MIMO mode simultaneously using the at least one first RF circuit 481 included in the first module 441 and the at least one fourth RF circuit 484 included in the second module 442. When the wireless communication circuit transmits a Wi-Fi signal, the electronic device may prevent the first module 441 and the second module 442 from operating at the same time. One module of the first module 441 and the second module 442 may be allowed to perform data transmission for an arbitrarily scheduled time.

The first frequency band may include 2.4 GHz, and the second frequency band may include 5.0 GHz. The wireless communication circuit may adaptively change at least one of the first period to the fourth period. The wireless communication circuit may adaptively change at least one of the first period to the fourth period to satisfy SAR requirements. The wireless communication circuit may adaptively change at least one of the first period to the fourth period at least partly on the basis of the type and priority of data transmitted via a Wi-Fi signal. The wireless communication circuit may determine the type and the priority of the data on the basis of an application transmitted via the Wi-Fi signal. The wireless communication circuit may adaptively change at least one of the first period to the fourth period on the basis of the transmission speed of a Wi-Fi signal in the first frequency band and the transmission speed of a Wi-Fi signal in the second frequency band.

Figure 5:
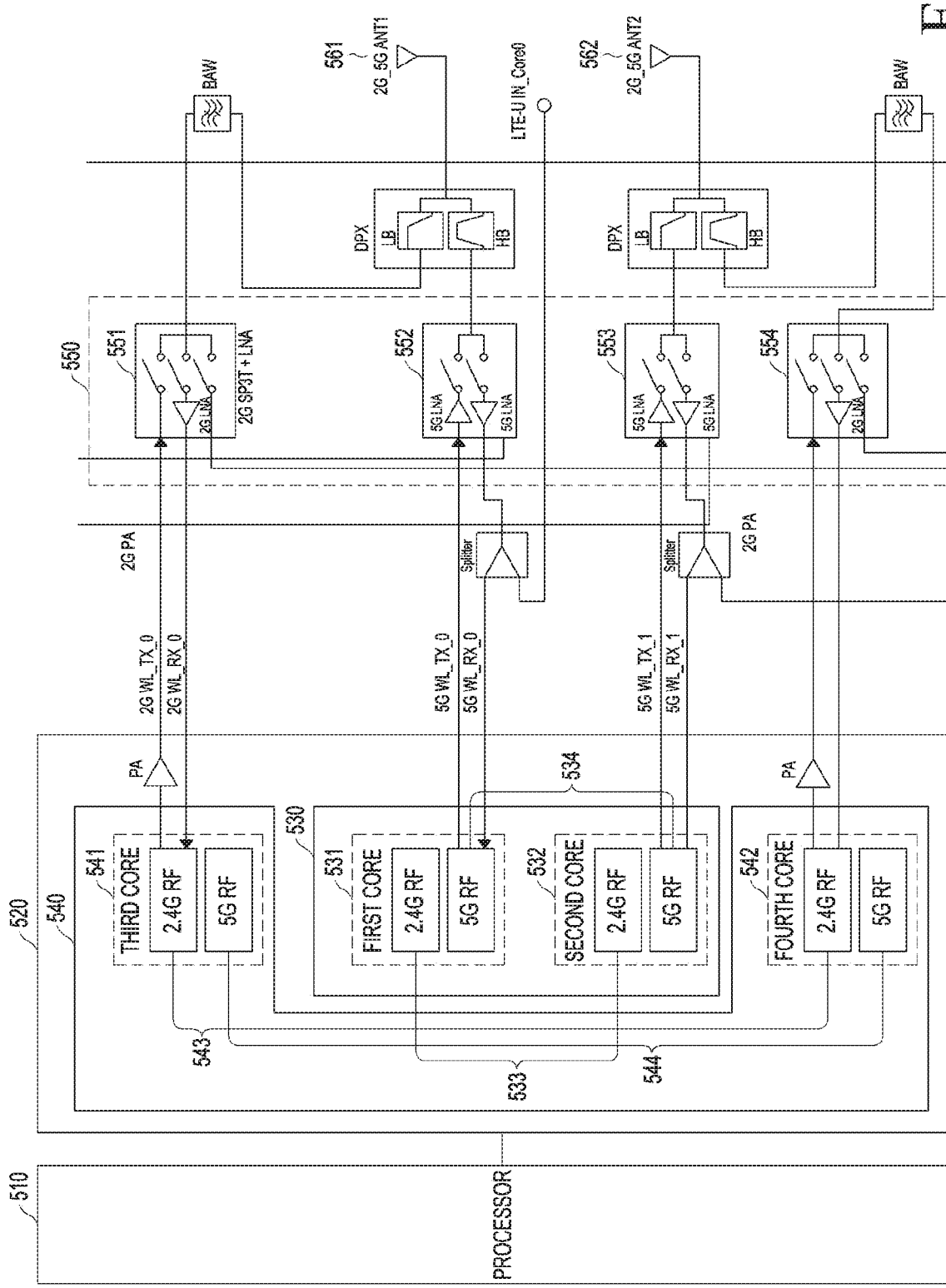
FIG. 5 is a diagram of an electronic device according to an embodiment.

FIG. 5 is a diagram of an electronic device according to an embodiment.

Referring to FIG. 5, an electronic device may include a touch screen display (not shown), a processor 510, a wireless communication circuit 520, a switching circuit 550, a first antenna 561, and a second antenna 562. The wireless communication circuit 520 may include a first module 530 and a second module 540. The first module 530 may include at least one first RF circuit 533 to perform at least one of transmission and reception of a Wi-Fi signal in a first frequency band, and at least one second RF circuit 534 to perform at least one of transmission and reception of a Wi-Fi signal in a second frequency band. The second module 540 may include at least one third RF circuit 543 to perform at least one of transmission and reception of a Wi-Fi signal in the first frequency band, and at least one fourth RF circuit 544 to perform at least one of transmission and reception of a Wi-Fi signal in the second frequency band. Each of the at least one first RF circuit 533 and each of the at least one second RF circuit 534 included in the first module 530 may be disposed in a first core 531 and a second core 532 included in the first module 530. The first core 531 may include one first circuit and one second circuit, and the second core 532 may include one first circuit and one second circuit. Each of the at least one third RF circuit 543 and each of the at least one fourth RF circuit 544 included in the second module 540 may be disposed in a third core 541 and a fourth core 542 included in the second module 540. The third core 541 may include one first RF circuit and one second RF circuit, and the fourth core 542 may include one first RF circuit and one second RF circuit.

Through a switching circuit set 550 including a first switching circuit 551, a second switching circuit 552, a third switching circuit 553, and a fourth switching circuit 554, the first antenna 561 may be electrically connected to at least one of the at least one first RF circuit 533 to the at least one fourth RF circuit 544, and the second antenna 562 may be electrically connected to at least one of the at least one first RF circuit 533 to the at least one fourth RF circuit 544. The first frequency band may be a frequency band including 2.4 GHz, and the second frequency band may be a frequency band including 5.0 GHz.

When the electronic device 101 transmits Tx data or receives Rx data using wireless communication in the first frequency band, the processor 510 may control the wireless communication circuit 520 to transmit Tx data or to receive Rx data using the first antenna 561 through the first RF circuit 533 included in the first core 531 and the second switching circuit 552 and using the second antenna 562 through the second RF circuit 534 included in the second core 532 and the third switching circuit 553.

When the electronic device 101 transmits Tx data or receives Rx data using Wi-Fi communication in the second frequency band, the processor 510 may control the wireless communication circuit 520 to transmit Tx data or to receive Rx data using the first antenna 561 through the third RF circuit 543 included in the third core 541 and the first switching circuit 551 and using the second antenna 562 through the fourth RF circuit 544 included in the fourth core 542 and the fourth switching circuit 554.

Data transmission and data reception by the electronic device 101 may be performed simultaneously. When the electronic device 101 transmits or receives data using Wi-Fi communication in the second frequency band, the processor 510 may control the wireless communication circuit 520 to receive Rx data using the first antenna 561 through the third RF circuit 543 included in the third core 541 and the first switching circuit 551 and using the second antenna 562 through the fourth RF circuit 544 included in the fourth core 542 and the fourth switching circuit 554. The electronic device may receive Rx data using all of the first RF circuit and the second RF circuit connected to the first antenna and the third RF circuit and the fourth RF circuit connected to the second antenna.

Figure 6:
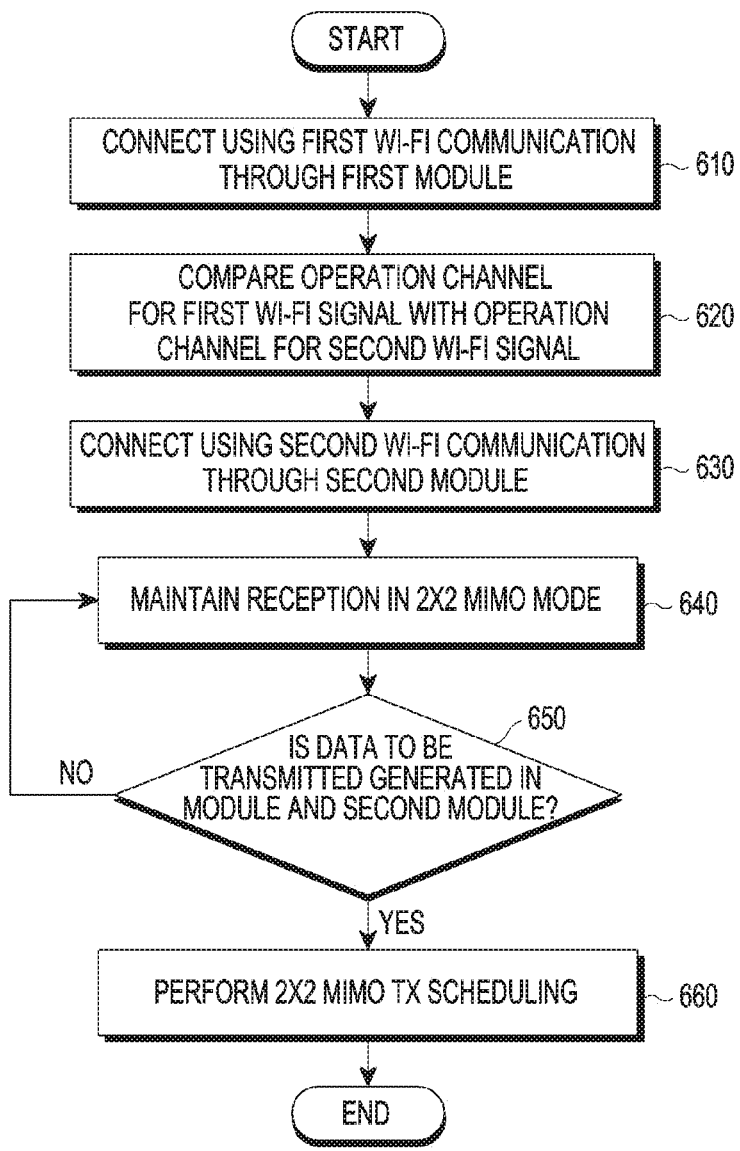
FIG. 6 is a flowchart of a method for controlling an electronic device according to an embodiment.

FIG. 6 is a flowchart of a method for controlling an electronic device according to an embodiment.

Referring to FIG. 6, at step 610, a wireless communication circuit 400 of an electronic device 101 may be connected using first Wi-Fi communication through a first module 441. Connection using the first Wi-Fi communication may be realized in various ways using a station mode, Wi-Fi direct, IBSS, Soft AP, NAN, or 802.11ad/af/ah.

At step 620, the wireless communication circuit 400 may compare a connection operation channel for the first Wi-Fi communication with a connection operation channel for second Wi-Fi communication. When connection using the second Wi-Fi communication is triggered with connection using the first Wi-Fi communication performed through the first module 441, the wireless communication circuit 400 may compare the connection operation channel for the first Wi-Fi communication with the connection operation channel for the second Wi-Fi communication. The connection operation channel for the first Wi-Fi communication and the connection operation channel for the second Wi-Fi communication may be the same or different. When the connection operation channel for the first Wi-Fi communication and the connection operation channel for the second Wi-Fi communication are different, the wireless communication circuit may perform the connection using the second Wi-Fi communication through a second module at step 630.

At step 640, the wireless communication circuit may maintain an operation of simultaneous receptions in the 2*2

MIMO mode in the first Wi-Fi communication and the second Wi-Fi communication connected via the first module and the second module. The wireless communication circuit may receive Rx data using a first antenna and a second antenna. When the wireless communication circuit transmits data via a first Wi-Fi signal and a second Wi-Fi signal alternately using the first module and the second module, respectively, the first Wi-Fi signal and the second Wi-Fi signal may be received using both the first module and the second module. When the wireless communication circuit transmits the first Wi-Fi signal through the first module for a first period, transmits the second Wi-Fi signal through the second module for a second period, transmits a third Wi-Fi signal through the first module for a third period, and transmits a fourth Wi-Fi signal through the second module for a fourth period, the first module and the second module may receive the Wi-Fi signals for the entire first to fourth periods.

At step 650, the wireless communication circuit may identify whether data to be transmitted using at least one module of the first module and the second module is generated.

When it is determined that data to be transmitted via at least one of the first module and the second module is generated at step 650, the electronic device may perform 2*2 MIMO Tx scheduling using the wireless communication circuit at step 660. The wireless communication circuit may perform Tx scheduling such that the first module and the second module do not transmit Wi-Fi signals at the same time. The electronic device may perform Tx scheduling using the wireless communication circuit such that the first module and the second module alternately transmit a Wi-Fi signal. When it is determined that data to be transmitted via at least one of the first module and the second module is not generated at step 650, the wireless communication circuit may return at step 640 and may maintain an operation of simultaneous receptions in the 2*2 MIMO mode in the first Wi-Fi communication and the second Wi-Fi communication connected via the first module and the second module. Alternatively, the electronic device may receive data in a first frequency band and a second frequency band using all of the first module, the second module, the first antenna, and the second antenna even while performing at steps 650 and 660.

Figure 7:
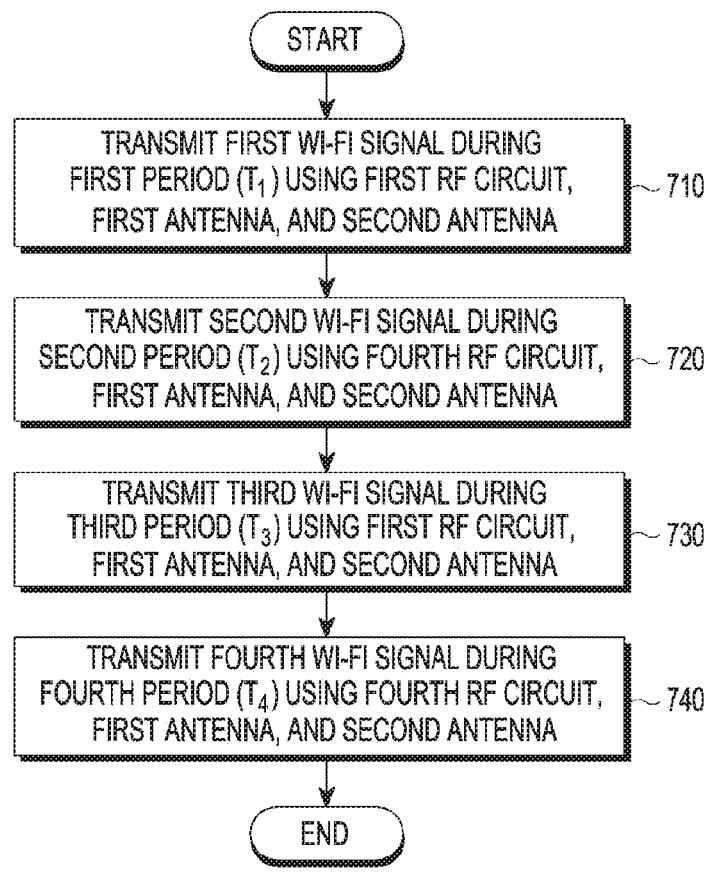
FIG. 7 is a flowchart of a method for an electronic device to schedule data transmission according to an embodiment.
Figure 8A:
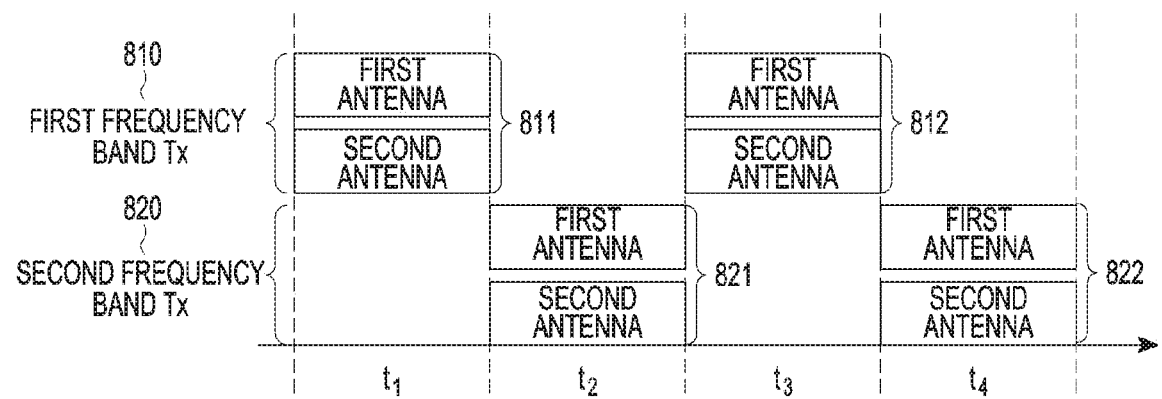
FIG. 8A is a diagram of a configuration for an electronic device to schedule Tx data according to an embodiment.

FIG. 7 is a flowchart of a method for an electronic device to schedule data transmission according to an embodiment. FIG. 8A is a diagram of a configuration for an electronic device to schedule Tx data according to an embodiment.

Referring to FIGS. 7 and 8A, at step 710, an electronic device 101 may transmit a first Wi-Fi signal 811 using a wireless communication circuit 400 for a first period (t1) through at least one first RF circuit, a first antenna 461, and a second antenna 462. The first Wi-Fi signal may be a Wi-Fi signal in a frequency band including a first frequency (e.g., 2.4 GHz). The electronic device may transmit the first Wi-Fi signal 811, via the wireless communication circuit, for the first period (t1) using the first antenna and the second antenna electrically connected to the at least one first RF circuit included in a first module that supports Tx 810 in the first frequency band. The wireless communication circuit may control a second module, which corresponds to Tx 820 in a second frequency band, not to transmit a Wi-Fi signal for the first period (t1). For the first period, a second RF circuit corresponding to the second frequency band in the first module, and a third RF circuit and a fourth RF circuit included in the second module may not be used for the transmission of a Wi-Fi signal.

At step 720, the wireless communication circuit may transmit a second Wi-Fi signal 821 for a second period (t2) using the fourth RF circuit, the first antenna, and the second antenna. The second period (t2) and the first period (t1) may be the same or different and may be adjustable. The second frequency band may be a frequency band including 5 GHz. The wireless communication circuit may transmit the second Wi-Fi signal 812 for the second period (t2) using the first antenna and the second antenna electrically connected to the fourth RF circuit of the second module that supports Tx 820 in the second frequency band. The wireless communication circuit may control the first module not to transmit a Wi-Fi signal for the second period (t2). For the second period, at least one first RF circuit and at least one second RF circuit included in the first module, and at least one third RF circuit corresponding to the first frequency included in the second module may not be used for the transmission of a Wi-Fi signal.

At step 730, the wireless communication circuit may transmit a third Wi-Fi signal 812 for a third period (t3) using the at least one first RF circuit of the first module supporting Tx 810 in the first frequency band, and the first antenna and the second antenna electrically connected to the first module. The third Wi-Fi signal may be a Wi-Fi signal corresponding to a frequency band including 2.4 GHz. The wireless communication circuit may control the second module not to transmit a Wi-Fi signal for the third period (t3). For the third period, the at least one second RF circuit corresponding to the second frequency band in the first module, and the at least one third RF circuit and the at least one fourth RF circuit included in the second module may not be used for the transmission of a Wi-Fi signal.

At step 740, the wireless communication circuit may transmit a fourth Wi-Fi signal 822 for a fourth period (t4) using the at least one fourth RF circuit, the first antenna, and the second antenna. The wireless communication circuit may control the first module not to transmit a Wi-Fi signal for the fourth period (t4). For the fourth period, the at least one first RF circuit and the at least one second RF circuit included in the first module, and the at least one third RF circuit corresponding to the first frequency included in the second module may not be used for the transmission of a Wi-Fi signal. The wireless communication circuit may adaptively change at least one of the first period to the fourth period. The wireless communication circuit may adaptively change at least one of the first period to the fourth period to satisfy the SAR requirements. When Wi-Fi communication performed using the first antenna and the second antenna does not satisfy the SAR requirements, the wireless communication circuit may adaptively change the first period to the fourth period to satisfy the SAR requirements. The wireless communication circuit may adaptively change the first period to the fourth period on the basis of the performance of the first module and the second module or an application using Wi-Fi communication.

Figure 8B:
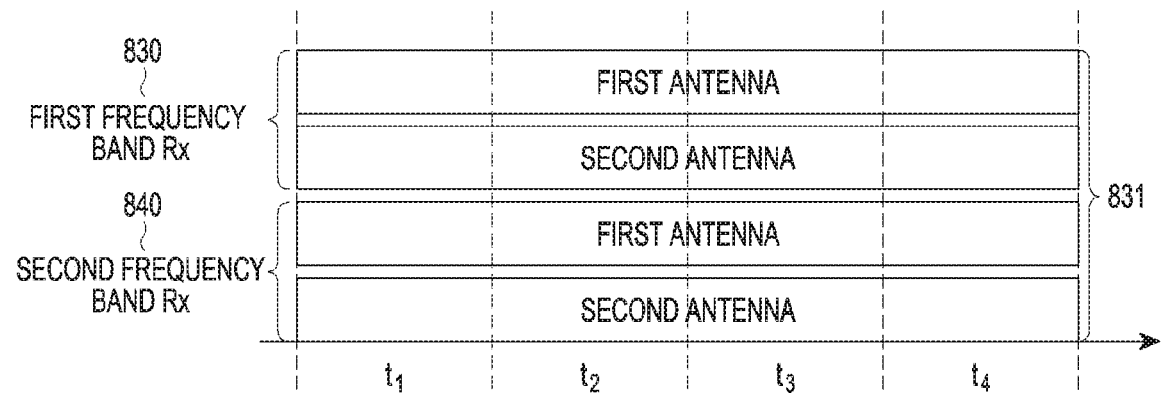
FIG. 8B is a diagram of a configuration for an electronic device to schedule Rx data according to an embodiment.

FIG. 8B is a diagram of a configuration for an electronic device to perform Rx scheduling according to an embodiment.

Referring to FIG. 8B, a wireless communication circuit may receive a Wi-Fi signal using a first module, a second module, a first antenna, and a second antenna for a first period through a fourth period. While the wireless communication circuit of an electronic device transmits a first Wi-Fi signal 830 and a second Wi-Fi signal 840 alternately using the first module and the second module through Tx scheduling for the first period through the fourth period, the wireless communication circuit may receive a Wi-Fi signal 831 using all of the first module, the second module, the first antenna, and the second antenna for the first period through the fourth period. The wireless communication circuit of the electronic device may be configured to generally maintain simultaneous receptions in the 2*2 MIMO mode via two connections assigned to the first module and the second module. The first through fourth periods may be consecutive times. The second period may be a period following the first period, the third period may be a period following the second period, and the fourth period may be a period following the third period. The wireless communication circuit of the electronic device may adaptively change at least one of the first to fourth periods on the basis of Tx scheduling, and the electronic device may receive the Wi-Fi signal 831 in the 2*2 MIMO mode via the first module and the second module regardless of such a change.

Figure 9:
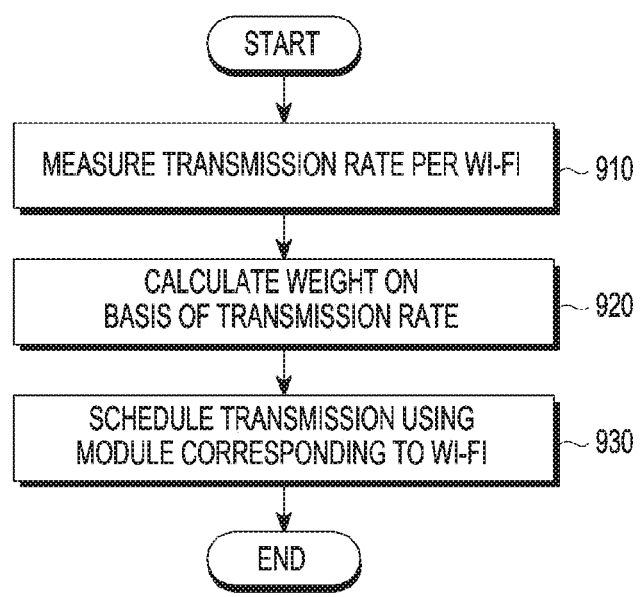
FIG. 9 is a flowchart of a method for controlling an electronic device according to an embodiment.

FIG. 9 is a flowchart of a method for controlling an electronic device according to an embodiment.

Referring to FIG. 9, when a first module 441 and a second module 442 are connected through first Wi-Fi communication and second Wi-Fi communication, a processor 120 of an electronic device 101 may apply a weight per Wi-Fi communication in view of the initial priority for each of the first Wi-Fi communication and the second Wi-Fi communication. Initial weights for the respective Wi-Fi communications may be 50:50.

At step 910, the processor may measure the transmission rate per Wi-Fi signal connected to the electronic device. The transmission rate may be obtained by measuring the transmission rate of each Wi-Fi signal for an arbitrary time.

At step 920, the processor may calculate a weight per Wi-Fi on the basis of the obtained transmission rate. When the average transmission rate of a first Wi-Fi signal is 50 Mbps and the average transmission rate of a second Wi-Fi signal is 100 Mbps, weights for the first Wi-Fi signal and the second Wi-Fi signal may be set to 1:2. Even after measuring the average transmission rates of the first Wi-Fi signal and the second Wi-Fi signal and setting the weights for the first Wi-Fi signal and the second Wi-Fi signal, the processor may periodically measure the average transmission rates of the first Wi-Fi signal and the second Wi-Fi signal. Alternatively, when a particular event occurs in the electronic device, the processor may also remeasure the average transmission rates of the first Wi-Fi signal and the second Wi-Fi signal and may reset the weights for the first Wi-Fi signal and the second Wi-Fi signal on the basis of the remeasured average transmission rates. The particular event may include various cases, such as where a particular application is executed by the processor or where it is detected that a user holds the electronic device. The performance of hardware configuring the first antenna may be the same as or different from that of the second antenna.

At step 930, the processor may schedule transmission using a module corresponding to Wi-Fi on the basis of the weights for the Wi-Fi signals. When the weights are set to 1:2, transmission time using the first Wi-Fi signal and transmission time using the second Wi-Fi signal may be set to 1:2. For example, referring to FIG. 8A, the ratio between the time when the first module 441 transmits the first Wi-Fi signal (e.g., the first period (t1) and the third period (t3)) and the time when the second module 454 transmits the second Wi-Fi signal (e.g., the second period (t2) and the fourth period (t4)) may be 1:2.

Figure 10:
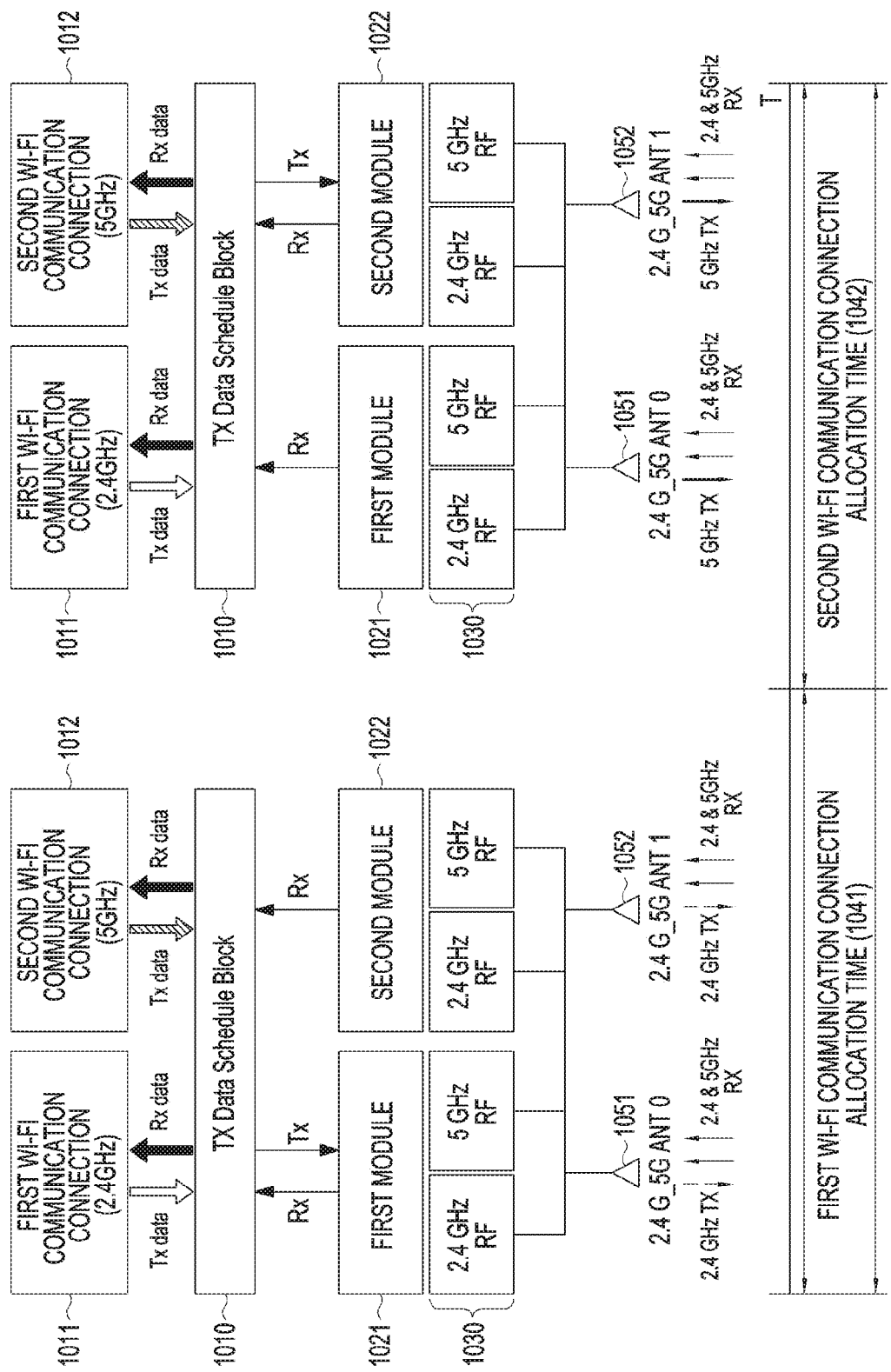
FIG. 10 is a diagram of a configuration for an electronic device to perform scheduling by time according to an embodiment.

FIG. 10 is a diagram of a configuration for an electronic device to perform scheduling by time according to an embodiment.

Referring to FIG. 10, when an electronic device is connected via first Wi-Fi communication 1011 including 2.4 GHz and second Wi-Fi communication 1012 including 5 GHz, a Tx data scheduling block 1010 of the electronic device may assign exclusive operation times to a first module 1021 corresponding to first Wi-Fi communication connection and a second module 1022 corresponding to second Wi-Fi communication connection, thereby transmitting Wi-Fi signals. The Tx data scheduling block 1010 may receive Wi-Fi signals using all of a first antenna 1051, a second antenna 1052, and four 2.4 GHz and 5 GHz RF circuits 1030 included in the first module 1021 and the second module 1022 for first Wi-Fi communication connection allocation time 1041 and second Wi-Fi communication connection allocation time 1042. The Tx data scheduling block 1010 may transmit a first Wi-Fi signal using the first module 1021, the first antenna 1051, and the second antenna 1052 for the first Wi-Fi communication connection allocation time 1041, and may control the second module 1022 not to transmit a Wi-Fi signal.

The wireless communication module may transmit a second Wi-Fi signal using the second module 1022, the first antenna 1051, and the second antenna 1052 for the second Wi-Fi communication connection allocation time 1042, and may control the first module 1021 not to transmit a Wi-Fi signal. The weights depicted in FIG. 9 may be represented by the first Wi-Fi communication connection allocation time 1041 and the second Wi-Fi communication connection allocation time 1042. When the ratio between the weights is 5:5 and a repetition period 1043 determined by a terminal is 100 ms, first Wi-Fi connection and second Wi-Fi connection are assigned exclusive operation times of 50 ms. The processor may dynamically change the operation times for the first module and the second module. The operation times for the first module and the second module set as above may be dynamically changed on the basis of priority of date to be transmitted or the attribute of a packet that is a data transmission unit.

Figure 11:
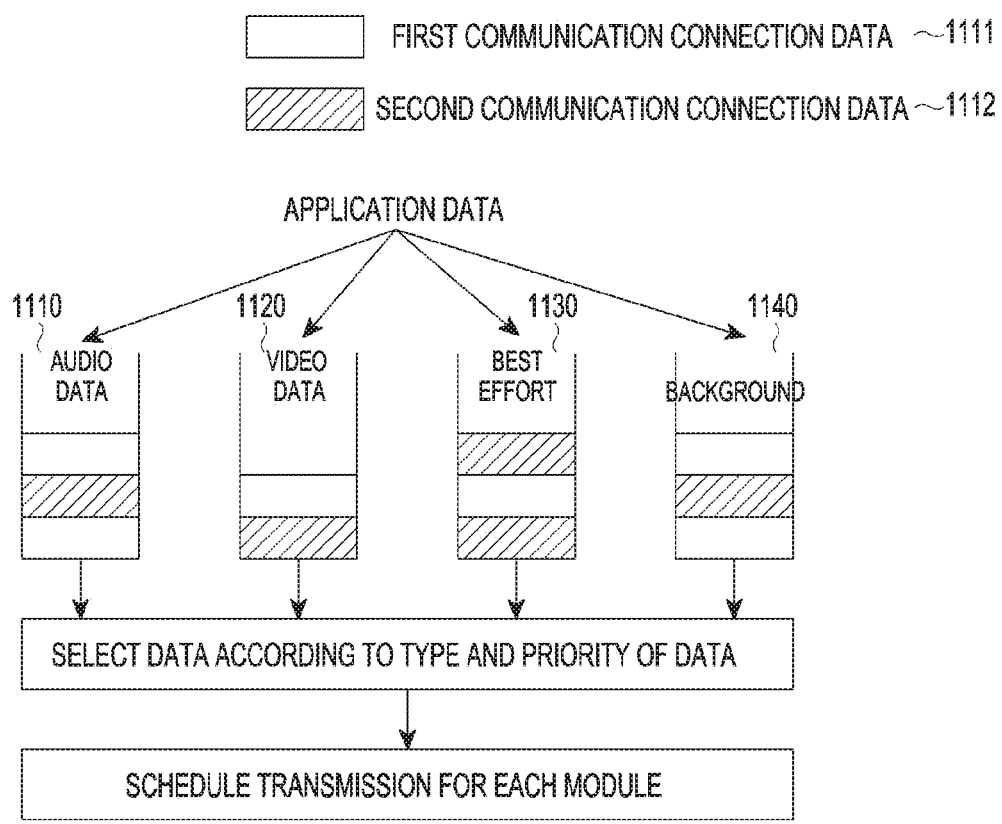
FIG. 11 is a diagram of a criterion for an electronic device to perform scheduling according to an embodiment.

FIG. 11 is a diagram of a criterion for an electronic device to perform scheduling according to an embodiment.

A wireless communication circuit may adaptively change at least one of a first period to a fourth period at least partly on the basis of the type and priority of data transmitted via a Wi-Fi signal. The wireless communication circuit may determine the type and priority of the data on the basis of an application transmitted via the Wi-Fi signal. An electronic device may classify application data as first communication connection data 1111 or second communication connection data 1112 and may assign the application data to at least one of queues 1110-1140.

When the ratio of minimum transmission data required according to the characteristics of an application using each Wi-Fi connection is determined, the electronic device may calculate weights for Wi-Fi communication connection in a first frequency band and Wi-Fi communication connection in a second frequency band on the basis of the determined ratio and may schedule Wi-Fi signal transmission.

The wireless communication circuit may sequentially process and transmit data assigned to a transmission queue. Data coming from a higher application may be stored in each queue according to the priority or Wi-Fi multimedia-access categories (WMM-AC) attribute. The wireless communication circuit may assign, according to the processing unit, a plurality of pieces of data included in application data 1100 to at least one of a queue 1110 corresponding to audio data, a queue 1120 corresponding to video data, a queue 1130 corresponding to a best effort mode, and a queue 1140 corresponding to a background. When data is stored in each queue, the wireless communication circuit may determine which Wi-Fi communication is used to transmit individual data among first Wi-Fi communication and second Wi-Fi communication. The wireless communication circuit may input the data to at least one of the plurality of queues 1110-1140 according to at least one of the type and the priority of the data. The wireless communication circuit may schedule the at least one queue, to which the data is input, among the plurality of queues 1110-1140 to be sequentially transmitted according to the first-input first-output (FIFO) mode in which a queue input first is processed first. A Tx data scheduling block of the wireless communication circuit may assign the currently selected data to each module for each interface that corresponds to the currently selected data, and may control subsequent data not to be transmitted until the data is entirely transmitted and processed.

The processor may set the priority of data to be transmitted according to the attribute of a packet corresponding to the unit of the data to be transmitted, or may adjust the designated priority according to the attribute of the packet. When the processor transmits a data packet using a first module that transmits data using Wi-Fi communication in the first frequency band, if it is required to transmit a data packet using a second module that transmits data using Wi-Fi communication in the second frequency band, the processor may change the designated priority and may transmit the data packet using the second module. When the processor transmits a data packet using the first module, if it is required to transmit a management frame with a higher priority or an ACK message, the processor may transmit a frame with a higher priority first using the second module.

A wireless communication circuit may calculate the weights according to the usage pattern or input of a user. The wireless communication circuit may measure the usage times of each application using first Wi-Fi connection and second Wi-Fi connection, may calculate weights for the Wi-Fi connections on the basis of the measured usage times, and may set connection times for the Wi-Fi connections on the basis of the weights.

A method for controlling an electronic device according to an embodiment may include transmitting a first Wi-Fi signal corresponding to a first frequency band using a first module for a first period, transmitting a second Wi-Fi signal corresponding to a second frequency band using a second module for a second period, and receiving a Wi-Fi signal using the first module and the second module for the first period and the second period. The first frequency band may include 2.4 GHz, and the second frequency band may include 5.0 GHz. The first period and the second period may be adaptively changed. The first period and the second period may be adaptively changed so that an SAR requirement is satisfied. At least one of the first period and the second period may be adaptively changed at least partly on the basis of the type and the priority of data transmitted via the Wi-Fi signal. The type and the priority of the data may be determined on the basis of an application transmitted via the Wi-Fi signal. At least one of the first period and the second period may be adaptively changed on the basis of the transmission speed of the Wi-Fi signal in the first frequency band and the transmission speed of the Wi-Fi signal in the second frequency band.

An electronic device according to an embodiment may include a processor, and a wireless communication circuit. The wireless communication circuit may transmit a Wi-Fi signal corresponding to a first frequency band and a Wi-Fi signal corresponding to a second frequency band using a first module for a first period, transmit the Wi-Fi signal corresponding to the first frequency band and the Wi-Fi signal corresponding to the second frequency band using a second module for a second period, and receive a Wi-Fi signal using the first module and the second module for the first period and the second period. The first module may include a first circuit configured to perform at least one of transmission and reception of a Wi-Fi signal in a first frequency band and a second circuit configured to perform at least one of transmission and reception of a Wi-Fi signal in a second frequency band. The second module may include a third circuit configured to perform at least one of transmission and reception of a Wi-Fi signal in the first frequency band and a fourth circuit configured to perform at least one of transmission and reception of a Wi-Fi signal in the second frequency band. The first frequency band may include 2.4 GHz, and the second frequency band may include 5.0 GHz. The wireless communication circuit may adaptively change at least one of the first period and the second period to satisfy an SAR requirement. The wireless communication circuit may adaptively change at least one of the first period and the second period at least partly on the basis of the type and the priority of data transmitted via a Wi-Fi signal.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a housing;
a touch screen display configured to be exposed through a portion of the housing;
a wireless communication circuit comprising:
a first module comprising at least one first circuit configured to perform at least one of transmission and reception of a Wi-Fi signal in a first frequency range and at least one second circuit configured to perform at least one of transmission and reception of a Wi-Fi signal in a second frequency range, and a second module comprising at least one third circuit configured to perform at least one of transmission and reception of a Wi-Fi signal in the first frequency range and at least one fourth circuit configured to perform at least one of transmission and reception of a Wi-Fi signal in the second frequency range;
a first antenna configured to be electrically connectable to at least one of the at least one first circuit, the at least one second circuit, the at least one third circuit, and the at least one fourth circuit;
a second antenna configured to be electrically connectable to at least one of the first circuit, the at least one second circuit, the at least one third circuit, and the at least one fourth circuit; and
a processor configured to be electrically connected to the touch screen display and the wireless communication circuit,
wherein the wireless communication circuit is configured to:
transmit a first Wi-Fi signal for a first period (t1) using the at least one first circuit, the first antenna, and the second antenna, without using the at least one second circuit, the at least one third circuit, and the at least one fourth circuit;

transmit a second Wi-Fi signal for a second period (t2), which follows the first period, using the at least one fourth circuit, the first antenna, and the second antenna, without using the at least one first circuit, the at least one second circuit, and the at least one third circuit;

transmit a third Wi-Fi signal for a third period (t3), which follows the second period, using the at least one first circuit, the first antenna, and the second antenna, without using the at least one second circuit, the at least one third circuit, and the at least one fourth circuit;

transmit a fourth Wi-Fi signal for a fourth period (t4), which follows the third period, using the at least one fourth circuit, the first antenna, and the second antenna, without using the at least one first circuit, the at least one second circuit, and the at least one third circuit; and receive a Wi-Fi signal for the first period to the fourth period using the at least one first circuit, the at least one fourth circuit, the first antenna, and the second antenna.

2. The electronic device of claim 1, wherein the first frequency band is 2.4 GHz, and the second frequency band is 5.0 GHz.

3. The electronic device of claim 1, wherein the wireless communication circuit adaptively changes at least one of the first period, the second period, the third period, and the fourth period.

4. The electronic device of claim 3, wherein the wireless communication circuit adaptively changes at least one of the first period, the second period, the third period, and the fourth period to satisfy a specific absorption rate (SAR) requirement.

5. The electronic device of claim 3, wherein the wireless communication circuit adaptively changes at least one of the first period, the second period, the third period, and the fourth period at least partly on the basis of a type and a priority of data transmitted via the Wi-Fi signal.

6. The electronic device of claim 5, wherein the wireless communication circuit determines the type and the priority of the data on the basis of an application transmitted via the Wi-Fi signal.

7. The electronic device of claim 3, wherein the wireless communication circuit adaptively changes at least one of the first period, the second period, the third period, and the fourth period on the basis of a transmission speed of the Wi-Fi signal in the first frequency band and a transmission speed of the Wi-Fi signal in the second frequency band.

8. A method for controlling an electronic device, comprising:

connecting the electronic device with an external electronic device using a wireless communication circuit of the electronic device, the wireless communication circuit including a first module and a second module, wherein the first module comprises a first circuit configured to transmit and receive a Wi-Fi signal in a first frequency band and a second circuit configured to transmit and receive a Wi-Fi signal in a second frequency band, wherein the second module comprises a third circuit configured to transmit and receive the Wi-Fi signal in the first frequency band and a fourth circuit configured to transmit and receive the Wi-Fi signal in the second frequency band;

after connecting the electronic device with the external electronic device, transmitting, to the external electronic device, a first Wi-Fi signal corresponding to the first frequency band using the first circuit of the first module for a first period through a first antenna and a second antenna of the electronic device; and transmitting, to the external electronic device, a second Wi-Fi signal corresponding to the second frequency band using the fourth circuit of the second module for a second period which follows the first period through the first antenna and the second antenna, wherein the electronic device, from the external electronic device, receives a Wi-Fi signal using the first circuit of the first module and the fourth circuit of the second module for the first period and the second period.

9. The method of claim 8, wherein the first frequency band is 2.4 GHz, and the second frequency band is 5.0 GHz.

10. The method of claim 8, wherein the first period and the second period are adaptively changed.

11. The method of claim 8, wherein the first period and the second period are adaptively changed so that a specific absorption rate (SAR) requirement is satisfied.

12. The method of claim 8, wherein at least one of the first period and the second period is adaptively changed at least partly on the basis of a type and a priority of data transmitted via the Wi-Fi signal.

13. The method of claim 12, wherein the type and the priority of the data are determined on the basis of an application transmitted via the Wi-Fi signal.

14. The method of claim 8, wherein at least one of the first period and the second period is adaptively changed on the basis of a transmission speed of the Wi-Fi signal in the first frequency band and a transmission speed of the Wi-Fi signal in the second frequency band.

15. An electronic device comprising:

a plurality of antennas including a first antenna and a second antenna;

a processor; and a wireless communication circuit including a first module and a second module, wherein the first module comprises a first circuit configured to transmit and receive a Wi-Fi signal in a first frequency band and a second circuit configured to transmit and receive a Wi-Fi signal in a second frequency band, wherein the second module comprises a third circuit configured to transmit and receive the Wi-Fi signal in the first frequency band and a fourth circuit configured to transmit and receive the Wi-Fi signal in the second frequency band, wherein the processor is configured to:

connect the electronic device with an external electronic device, after connecting the electronic device with the external electronic device, transmit, to the external electronic device, a first Wi-Fi signal corresponding to the first frequency band using the first circuit of the first module for a first period through the first antenna and the second antenna, transmit, to the external electronic device, a second Wi-Fi signal corresponding to the second frequency band using the fourth circuit of the second module for a second period which follows the first period through the first antenna and the second antenna, and receive, from the external electronic device, a Wi-Fi signal using the first circuit of the first module and the fourth circuit of the second module for the first period and the second period.

16. The electronic device of claim 15, wherein the first frequency band is 2.4 GHz, and the second frequency band is 5.0 GHz.

17. The electronic device of claim 15, wherein the wireless communication circuit adaptively changes at least one of the first period and the second period to satisfy an SAR requirement.

18. The electronic device of claim 15, wherein the wireless communication circuit adaptively changes at least one of the first period and the second period at least partly on the basis of a type and a priority of data transmitted via a Wi-Fi signal.

* * * * *